United States Patent [19]
Odom

[11] Patent Number: 5,587,317
[45] Date of Patent: Dec. 24, 1996

[54] CHEMICAL-BIOLOGICAL PROCESS FOR DEHALOGENATION OF HALOGENATED ORGANIC COMPOUNDS

[75] Inventor: James M. Odom, Avondale, Pa.

[73] Assignee: E. I. Du Pont de Memours & Company, Wilmington, Del.

[21] Appl. No.: 562,944

[22] Filed: Nov. 27, 1995

Related U.S. Application Data

[63] Continuation of Ser. No. 383,535, Feb. 2, 1995, abandoned, which is a continuation of Ser. No. 64,607, May 19, 1993, abandoned.

[51] Int. Cl.$^6$ ..................................................... C12P 5/02
[52] U.S. Cl. ........................................ 435/262.5; 435/262
[58] Field of Search ............................... 426/262.5, 260

[56] References Cited

U.S. PATENT DOCUMENTS

| | | | |
|---|---|---|---|
| 4,493,895 | 1/1985 | Colaruotolo et al. | 435/262 |
| 4,511,657 | 4/1985 | Colaruotolo et al. | 435/253 |
| 4,761,376 | 8/1988 | Kulpa et al. | 435/262 |
| 4,959,315 | 9/1990 | Nelson et al. | 435/167 |
| 5,004,551 | 4/1991 | Sublette | 210/763 |
| 5,009,999 | 4/1991 | Bopp | 435/29 |
| 5,200,343 | 4/1993 | Cole et al. | 435/262.5 |

FOREIGN PATENT DOCUMENTS

WO89/10772  11/1989  WIPO .............................. A62D 3/00

OTHER PUBLICATIONS

Stanier, R. Y. et al, *The Microbial World*, 5th Edition, Prentice Hall, Englewood Cliffs, NJ, 85–86 (1986).
Dolla, A. et al, *Biochimica et Biophysica Acta*, 932, 26 (1988).
Marks, T. S. et al, *Applied and Environmental Microbiology*, 55(5), 1258 (1989).
Assaf–Anid, N. et al, *Applied and Environmental Microbiology*, 58(3), 1057 (1992).
Klecka, G. M. et al, *Chemosphere*, 13(3), 391 (1984).
Baxter, R. M., *Chemosphere*, 21(4–5), 451 (1990).
Gantzer, C. J. et al, *Environ. Sci. Technol.*, 25(4), 715 (1991).
Sims, J. L. et al, *Remediation*, 1(1), 75 (1990–91).
Egli, C. et al, *FEMS Microbiology Letters*, 68, 207 (1990).
Krone, U. E. et al, *Biochemistry*, 28, 10061 (1989).
Freedman, D. L. et al, *Applied and Environmental Microbiology*, 55(9), 2144 (1989).
Krone, U. E. et al, *Biochemistry*, 28, 4908 (1989).
Holliger, C., *Journal of Bacteriology*, 174(13), 4427 (1992).
Mohn, W. W. et al, *Microbiological Reviews*, 56(3), 482 (1992).
Abstract: JP 57–145009, Derwent Publications, Sep. 7, 1982.
Stanier et al. *The Microbial World* 5th ed. Prentice–Hall, Englewood Cliffs, NJ pp. 85–86.

*Primary Examiner*—Carolyn Paden

[57] ABSTRACT

The invention relates to a method for the dehalogenation of organohalogen compounds commonly found as pollutants in soil and ground water. The instant method utilizes anaerobic bacteria comprising an extracellular electron transfer protein coupled with a tetrapyrrole catalyst to effect the reductive dehalogenation of halogenated organics. Optionally, an electron transport mediator may be used to enhance the rate of dehalogenation.

16 Claims, 8 Drawing Sheets

CHEMICAL-BIOLOGICAL PROCESS FOR DEHALOGENATION OF HALOGENATED ORGANIC COMPOUNDS

This is a continuation of application Ser. No. 08/383,535, filed Feb. 2, 1995, now abandoned which is a continuation of Ser. No. 08/064,607, filed May 19, 1993, now abandoned.

FIELD OF INVENTION

The invention relates to a method for the dehalogenation of organohalogen compounds commonly found as pollutants in soil and ground water. More specifically, the method utilizes anaerobic bacteria comprising an extracellular electron transfer protein coupled with a tetrapyrrole catalyst to effect the reductive dehalogenation of halogenated organics.

BACKGROUND

Groundwater pollution by halogenated, and particularly chlorinated solvents is a worldwide problem associated primarily with industrial sites where mishandling or improper disposal has brought these solvents in contact with the soil. The most common and problematic compounds are the chlorinated ethylenes such as tetra- tri- or di-chloroethylene. Carbon tetrachloride, chloroform and methylene chloride are also pervasive pollutants. The reasons for concern are basically threefold. First, most of these solvents are sparingly soluble in water and have the tendency to stick to soil particles. This results in tenacious underground plumes of solvent which cannot readily be removed by standard pump and treat technology (Biswas, N., et al., *Water Environ. Res.* 64, 170, 10, 1 (1992); Hutter, G. M., et. al., *Water Environ. Res.* 64, 69, (1992)). Second, the toxicology of many chlorinated solvents suggests that these compounds may be carcinogenic and damaging to specific organs such as the liver and kidneys (Price, P. S., Memo of the U.S. Environmental Protection Agency, Office of Water, Washington, D.C.(1985); Vogel, T. M., *Environ. Sci. Technol.*, 21, 722, (1987)). Finally, under conditions found in many aquifers and subsurface environments, chlorinated ethylenes and methanes are very slow to be degraded biologically. The result of these factors is that chlorinated solvents are long-lived potentially hazardous groundwater pollutants.

Currently there are two approaches to in situ removal of organohalogen pollutants. The first approach is the standard "pump and treat" method where groundwater is pumped to the surface for physical stripping of the contaminant from the water. For chlorinated solvents this is more of a containment method than a remediation technology although given sufficient time (typically decades to centuries) this method may capture most of the pollutant. The other approach is biological in nature and utilizes microorganisms for the enzymatic transformation of the halogenated organics. The biological approach may utilize microorganisms indigenous to a particular site where the remediation process consists primarily of making additions to the contaminated site that enhance the growth of the desired microorganism. Alternatively, nonindigenous microorganisms may be introduced to a contaminated site with the necessary amendments needed for growth. Dispersal of introduced microorganisms due to the filtration effect of aquifer sediments appears to be a major drawback to this approach.

A very limited number of pure strains of bacteria have been described which dehalogenate chlorinated solvents. Colaruotolo et al. (U.S. Pat. No. 4,511,657) claim the use of specially adapted microbial cultures to treat obnoxious waste, especially halogenated organic chemical waste (U.S. Pat. No. 4,493,895). EP 461144 teaches the use of members of the genera Rhodococcus and Mycobacterium to remediate chlorophenolic compounds from polluted soil and U.S. Pat. No. 5,009,999 disclose a biodegredation process for polychlorinated bi-phenyl compounds utilizing a strain of *Pseudomonas putida*. Additionally, strains of *Klebsiella oxytoca* have been demonstrated to degrade chlorobenzoic acid in liquid medium and use mono and di-chlorobenzoates as sole carbon sources (U.S. Pat. No. 4,761,376). Studies with crude anaerobic bacterial consortia have demonstrated both in the laboratory and in situ that chlorinated ethylenes or methanes can be completely dechlorinated to ethylene and methane respectively. (Freedman, D. L., et al., *Appl. Environ. Microbiol.*, 55, 2144, (1989)). This transformation occurs via a series of less chlorinated intermediates in successive reductive steps, however, the organism or organisms responsible have not been readily purified from these consortia.

Certain species of the anaerobic sulfate-reducing and methanogenic bacteria appear to have an enhanced ability to dehalogenate halogenated solvents when compared to other bacteria. However, this trait appears to be rare even among these two groups. *Desulfomonile tiedjeii*, a unique isolate, is one of the most active dechlorinating anaerobes described to date (Mohn, W. W., et al., *Microbiological Reviews*, 56, 482, (1992)). This organism has been shown to dechlorinate tetrachloroethylene, but is more efficient against chloroaromatics. Desulfobacter sp, methanogenic bacteria and certain acetogenic bacteria such as *Acetobaterium woodii* have also been shown to dechlorinate chloro-aliphatics at very low rates (Egli, C. S., et al., *FEMS Microbiol. Lett.*, 68, 207 (1990)). Egli et al. teach that when these bacteria are incubated under anaerobic conditions in reduced buffer, suspensions of each organism degraded carbon tetrachloride forming less highly chlorinated methanes and carbon dioxide as products. The physiological significance of this activity to the organism is unknown and may simply be a fortuitous sidereaction with little energetic or nutritional consequence to the organism. The microbiology of anaerobic dehalogenation of chlorinated solvents is only currently being resolved and is largely phenomenological. The biochemistry of anaerobic dehalogenation is poorly understood being limited by the extraordinarily low rates of dehalogenation exhibited by pure cultures (Mohn, W. W., et al., *Microbiological Reviews*, 56, 482 (1992)).

The methods cited above are useful and clearly show that microorganisms can be used to degrade halogenated organics from both soil and aqueous environments. There are, however, several disadvantages to the methods outlined in the existing art. Examples given in the art describe decontamination of the environment using specific naturally occurring, or genetically engineered cultures of bacteria or the preliminary harsh chemical treatment of toxic contaminants prior to biological treatment with microbes. It should be noted that chemical treatment of the contaminated area is likely to kill the majority of the indigenous microbial flora and thus impede any effort at bioremediation. The isolation or engineering, culturing and inoculation of specific microorganisms particularly selected for the degradation of specific organic contaminants is labor intensive and time consuming. Furthermore, as previously mentioned, in the absence of oxygen, degradation of chlorinated hydrocarbons proceeds very slowly. Years of costly groundwater recirculation may be required for conventional bioremediation to completely mineralize a pollutant. Bioremediation is very poorly understood in terms of the taxonomic types of organisms required for dechlorination. It is commonly observed that a bioremediation strategy successful at one contaminated site may not work at another. Furthermore the microbiology of some sediments cannot be induced to dechlorinate pollutants under any conditions. Certain pollutants such as perchloroethylene, for example, may be biologically transformed to vinyl chloride which is far more toxic than the original parent compound. Thus every attempt at bioremediation must be preceded by costly laboratory microcosm studies and pilot field studies to determine if dechlorinating organisms are present and, if so, what nutritional supplements need to be added to the sediments to encourage growth of these organisms.

Abiotic anaerobic dehalogenation of chlorinated hydrocarbons by iron-, nickel-, or cobalt-containing tetrapyrroles has been reported by several investigators. Krone, U. E., et al., *Biochemistry*, 28, 4908 (1989) teach the use of corrinoids to catalyze the reductive dehalogenation of carbon tetrachloride in conjunction with either titanium(III) citrate or dithiothreitol (DTT) as electron donors. The degradation products formed by this process included chloroform, methylene chloride, chloromethane, and $CH_4$, indicating that complete dechlorination is possible. Additionally, Krone, U. E., et al. (*Biochemistry*, 28, 10061 (1989)), demonstrated that corrin and corrinoid catalyzed dechlorination of carbon tetrachloride may also be mediated by the nickle-containing porphinoid, coenzyme F430 found in methanogenic bacteria. Marks T., et al. (WO 8910772) teach a method for the dehalogenation of organohalogen compounds by reacting the organohalogen with a reducing agent in the presence of a selected metal-centered porphyrins, corrins or phthalocyanine complexes. The method of Marks et al. encompasses the use of a complex comprising the above mentioned ring structures in association with metals selected from groups 2, 5, 6, 8, 9, or 10 of the Periodic Table.

Gantzer, C. J., et al., (*Environ. Sci. Technol.*, 25, 715 (1991)) demonstrate that the bacterial transition-metal coenzymes vitamin B12 (containing cobalt), coenzyme F430 (containing nickle) and hematin (containing iron) catalyzed the reductive dechlorination of polychlorinated ethylenes and benzenes. Gantzer discloses that for vitamin B12 and coenzyme F430 the reductive dechlorination rates for different classes of perchlorinated compounds had the following order: carbon tetrachloride>tetrachloroethylene>hexachlorobenzene. For hematin, the order of reductive dechlorination rates was carbon tetrachloride>hexachlorobenzene>tetrachloroethylene. Within each class of compounds, rates of dechlorination decreased with decreasing chlorine content. In the reductive dechlorination of trichloroethylene, cis-1,2-dichloroethylene was the predominant product formed with vitamin B12, coenzyme F430, and hematin. Pentachlorobenzene and pentachlorophenol were each dechlorinated by vitamin B12 to yield two out of three possible isomeric tetrachlorobenzenes.

The abiotic methods involving tetrapyrroles disclosed in the art are useful for the dehalogenation of organic solvents however the requirement for the presence of a strong reductant limits their use in a subsurface application where the concentration and chemical nature of the required reductant would be prohibitive from both a regulatory and economic perspective. Thus, tetrapyrrole catalysis has, until now, only been considered an ex situ technology.

One factor essential to the metabolism of Desulfovibrio, which is potentially capable of acting as a strong reductant, is the periplasmic (external to the cytoplasmic membrane) electron carrier protein, cytochrome $c_3$. This protein is localized on the exterior of the cell and is thus accessible to external electron transfer reactions. The electron transfer proteins from Desulfovibrio appear to be very diverse and contain at least four different c type cytochromes, including the monohemic cytochrome c553 (Mr 9000), the tetrahemic cytochrome $c_3$ (Mr 13000), the octahemic cytochrome c3 (Mr 26000) and a high molecular weight cytochrome (Mr65000) called Hmc, containing sixteen hemes (Haladijian, J., et al., *Biochem. Biophys. Res. Com.*, 179, 605 (1991)). A common pattern of the cytochrome c3 superfamily is that they contain c-type hemes having low redox potentials within the approximate range of −120 to −400 mV. The cytochrome $c_3$ proteins function within the cell to transport electrons between hydrogenase and the rest of the electron transfer chain. To date, the reducing power of the periplasmic cytochrome $c_3$ has not been coupled to any process for the dehalogenation of compounds.

From the art it is clear that a need remains for a method of dehalogenating halogenated organic pollutants in situ reliably and reproducibly at degradation rates higher than currently possible in biological systems. It is the object of the present invention to meet such a need by providing a method that utilizes indigenous populations of sulfate-reducing bacteria in combination with tetrapyrrole catalysts to effect the dehalogenation of halogenated organics in situ. The instant method utilizes sulfate reducing bacteria with the associated $c_3$ cytochrome to provide electrons to a tetrapyrrole (vitamin B12) to catalyze the dechlorination of various chlorinated solvents. The present invention is an improvement over the art in several ways. The present method utilizes bacteria indigenous to most aquifer systems to provide the strong reductant to drive tetrapyrrole catalysis. The site need not contain dechlorinating organisms, only sulfate-reducing bacteria are required. Secondly, operationally this process would be the same regardless of the site, i.e., generation of nutritional conditions for sulfate-reducers and once they are established addition of the dechlorinating reagent. Thus, the remediation would resemble a process rather than a costly R&D project aimed at determining if dechlorinating bacteria are present.

Additionally, the instant method should provide a dramatic increase in rate of bioremediation and the overall reliability and reproducibility of the practice of bioremediation. The present invention requires only that the inherent microbiology of any sediment contain sulfate-reducing bacteria. Numerous field and laboratory studies have shown these organisms to be generally present in sediments and soils such that their presence can be relied upon (Vogel, T. M., *Environ. Sci. Technol.*, 21, No. E., pp 77–81 (1987)); (Mohn, W. W., et al., *Microbiological Reviews*, 56, 482 (1992)); Suflita, J. M., et al., *J. Ind. Microbiol.*, 3,179, (1988)). The nutritional characteristics of the sulfate-reducing bacteria are well resolved so that nutritional strategies to raise this group of bacteria are straightforward. Indigenous dechlorinating bacteria are not required but should not be inhibited by this process.

SUMMARY OF THE INVENTION

The present invention provides a method for the dehalogenation of organohalogens comprising growing a culture of bacterial cells which comprise an extracellular electron transport protein, in the presence of a suitable reductant-;contacting the cells with a media containing organohalogen compounds and a tetrapyrrole catalyst to form a reaction mixture; and incubating the reaction mixture under anaerobic conditions whereby dehalogenation of the organohalogens occurs.

This preferred embodiment is illustrated by the model shown in FIG. 1. FIG. 1 represents the electron transport metabolism of a typical sulfate-reducing cell. Sulfate-reducers will derive electrons either from the reduction of organics or directly from hydrogen, which may be provided as a byproduct of the metabolism of ubiquitous fermentive bacteria. Electrons are accepted by the bacterial hydrogenase (H2ase) and are shuttled to the periplasmic electron transfer protein, cytochrome $c_3$. For reductive dehalogenation of organohalogens, electrons are mediated from the cytochrome $c_3$ via an electron transport mediator such as riboflavin, to a tetrapyrrole catalysts (hematin) which is able to accomplish the dehalogenation reaction in the reduced state.

It is a further object of the present invention to provide a method for the dehalogenation of organohalogens comprising growing a mixed culture of bacterial cells comprising sulfate-reducing bacteria and fermentive bacteria in the presence of a carbon source, suitable for growth of the fermentive bacteria; contacting the cells with a media containing organohalogen compounds and a tetrapyrrole catalyst to form a reaction mixture; and incubating the reaction mixture under anaerobic conditions whereby dehalogenation of said organohalogens occurs. It is inherent in this method that the fermentive bacteria provide, as a byproduct of their metabolism, the reductant needed to drive the dehalogenation reaction.

It is further within the scope of the present invention to provide a method of in situ dehalogenation of organohalogens from a soil or ground water site comprising, assessing the site for concentrations of nutrients, contaminants and conditions capable of affecting the growth of the indigenous bacterial population; amending the site with a first amendment so as to produce sulfate-reducing conditions; monitoring the redox potential and sulfide production of the amended site; further amending the site with a second amendment comprising a tetrapyrrole catalyst while maintaining said sulfate-reducing conditions; and finally monitoring the site for the dehalogenation of organohalogens.

It is additionally within the scope of the present invention to supplement the reaction mixture of any of the above recited methods with an electron transfer mediator which serves to stimulate the rate of dehalogenation of organohalogens by facilitating the transfer of electrons from the electron transport protein to the tetrapyrrole catalyst.

Chemicals that may be dehalogenated by the present method comprise a variety of chlorinated solvents including but not limited to carbon tetrachloride, perchloroethylene, chloroform, methylene chloride, trichloroethylene, dichloroethylene, vinyl chloride, and chloroaromatics.

DETAILED DESCRIPTION OF THE INVENTION

Figure 1:
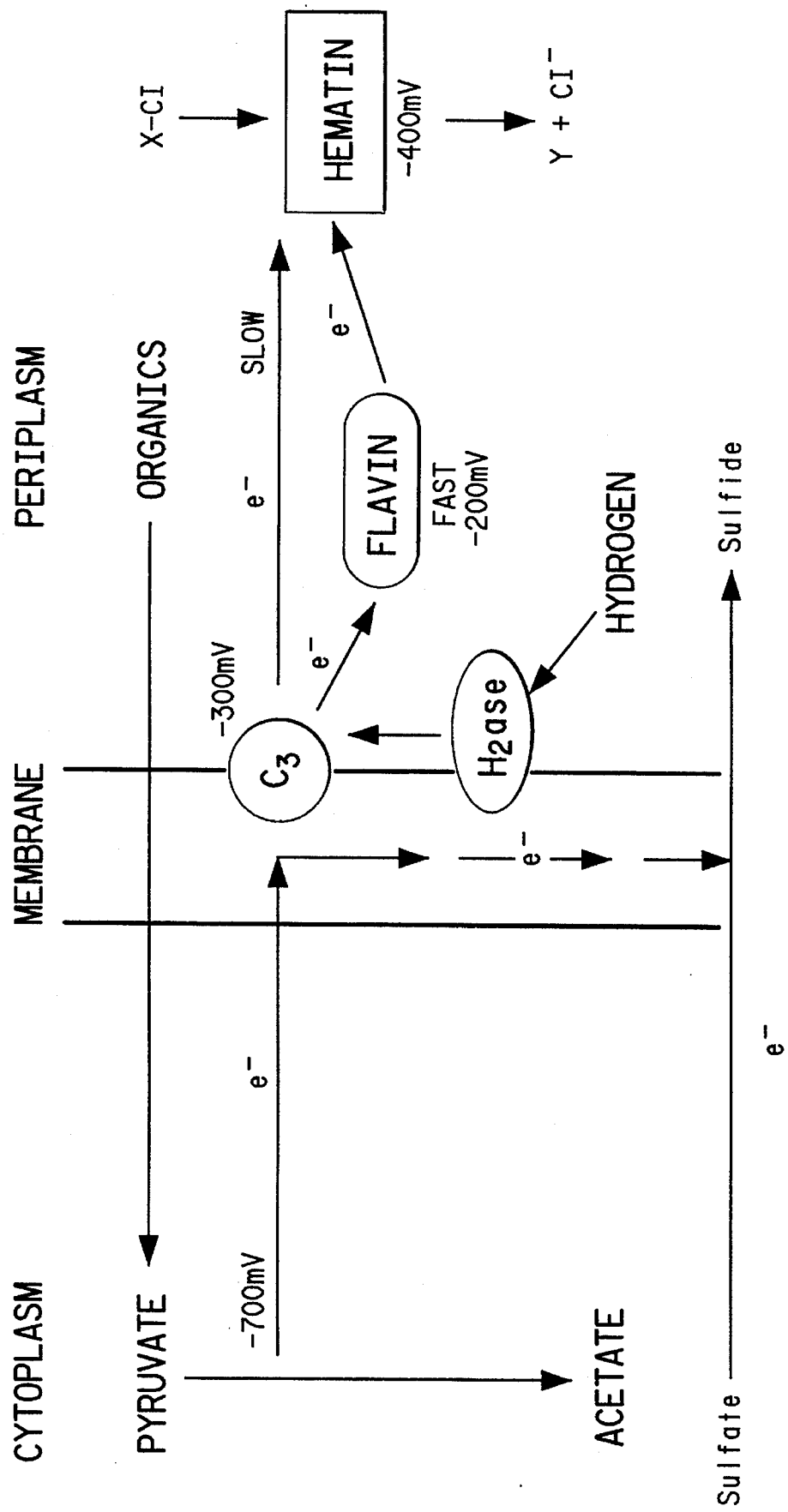
FIG. 1 illustrates the electron transfer from reductants within a typical sulfate reducing cell via the periplasmic cytochrome $c_3$ to the flavin electron transport protein and finally to the hematin tetrapyrrole catalyst.

As used herein the following terms may be used for interpretation of the claims and specification.

The term "sulfate-reducing bacteria" or "sulfate reducer" will refer to any species or strain of bacteria which are strictly anaerobic and which utilize sulfate as an electron acceptor for the oxdation of organic compounds or hydrogen. The sulfate reducers belong to several genera of bacteria including, Desulfovibrio, Desulfotomaculum, Desulfobacter, Desulfobulbus, Desulfosarcina, and Desulfonema.

The term "fermentive bacteria" will refer to an organism which is capable of carrying out an internal redox rearrangement of an organic substrate in the absences of any exogenous electron acceptor. Generally fermentive bacteria are obligate or facultative anaerobes and are often responsible for the production of hydrogen.

The term "sulfate-reducing conditions" will refer to any nutrient or growth conditions whereby sulfate-reducing bacteria, in combination with a source of sulfate, will generate hydrogen sulfide. Sulfate-reducing conditions are inherently anaerobic and require the presence of a source of sulfate.

The term "anaerobic conditions" will refer to any growth or nutrient conditions that exclude the presence of oxygen.

The term "tetrapyrrole" will refer to any compound comprising four pyrrole ring structures and capable of catalyzing the reductive dehalogenation of organohalogens. Tetrapyrroles may be complexed with metal ions or may be uncomplexed. Examples of typical tetrapyrroles may include but are not limited to, porphyrins, such as hematin, corrins such as vitamin B12 (cyanocobalamin), phthalocyanines, as well as various bacterial factors and coenzymes such as F430.

The term "organohalogen" will refer to any aliphatic or aromatic compound containing at least one of the group of halogens consisting of Fluorine, Bromine, Iodine, or Chlorine. Typical organohalogens that may be dehalogenated by the instant method include but are not limited to carbon tetrachloride, perchloroethylene, chloroform, methylene chloride, trichloroethylene, dichloroethylene, vinyl chloride, and chloroaromatics.

The term "contaminated media" or "media" will refer to any media containing detectable levels of organohalogens. Such media may include contaminated soils or groundwaters from industrial sites or laboratory culture media.

The term "electron transfer mediator" will refer to any material capable of transferring electrons from the cell to a tetrapyrrole for the purpose of reducing the tetrapyrrole and which contain an isoalloxazine ring structure. Examples of typical electron transfer mediators may include but are not limited to, members of the flavin class of compounds including riboflavin (FMN), flavin adenine dinucleotide (FAD).

The term "reductant" will refer to any material that is capable of either directly (chemically) or indirectly (via biological systems) of donating electrons to effect the reduction of a tetrapyrrole. It is to be understood that the reductant may be inorganic or organic. Examples of reductants suitable for the instant invention may include but are not limited to hydrogen gas, titanium citrate, dithiothreitol, sucrose, lactate or pyruvate.

The term "electron transport protein" will refer to a protein located extracellularly or within the periplasmic space of a microbial cell membrane which has redox potentials in the range of $-100$ to $-500$ mV and has the ability to transport electrons from an electron donor material (usually a reductant) to an electron acceptor material (usually a catalyst). A typical example of an electron transport protein is the cytochrome $c_3$.

The term "cytochrome $c_3$" will refer to a tetraheme, periplasmic protein associated with sulfate-reducing bacteria. The protein has mid-point redox potentials of between $-120$ to $-400$ mV and is involved in many electron transfers from hydrogen and other organics in sulfate-reducing bacteria.

The present invention provides a method for the dehalogenation of organohalogens involving the coupling of biologically active reductants to a tetrapyrrole catalyst via cellular electron transfer pathways involving cytochrome $c_3$. Transfer of electrons from the reductant as a result of normal cellular metabolism results in the reduction of the cytochrome $c_3$ and subsequently the tetrapyrrole which catalyzes the dehalogenation reaction. Optionally the rate of dehalogenation may be enhanced with the addition of an electron transfer mediator which serves to more efficiently couple the electron transport protein to the tetrapyrrole catalyst.

Suitable bacterial cells must only comprise an externally accessible electron transfer protein capable of transferring electrons to a suitable tetrapyrrole catalyst or electron transfer mediator-catalyst combination. It is to be understood that suitable cells are not necessarily individually capable of enzymatic dehalogenation of organohalogens, but only that the necessary redox active components be present. Optionally, it is preferred that the cells of the present invention be ubiquitous to a broad range of environments and hardy under adverse conditions such as are found in sites contaminated with organohalogens. For the purposes of the present invention sulfate-reducing bacterial cells are preferred.

Sulfate reducing bacteria are found in a variety of ecological settings, but prefer the anaerobic environments of marine and estuarine sediments as well as saline ponds. Carbon sources for these bacteria can be derived from the activities of heterotrophic microorganisms in the water column overlying the sediments or from direct organic influence, especially those habitats which are contaminated by a secondary nutrient input such as sewage effluent. (Gibson G. R., *J. Appl. Bacteriol.*, 69, 769 (1990).) The diversity of habitats in which the sulfate reducers are found make them prime candidates for the subject invention.

The sulfate reducers derive metabolic energy from a variety of substrates which function as electron donors in either oxidative or fermentive reactions pathways. Some of the most common reductants for sulfate reduction include, hydrogen, formate, acetate, propionate, butyrate, and lactate (Gibson G. R., *J. Appl. Bacteriol.*, 69, 769 (1990)). In the case of the sulfate-reducing bacteria low potential electrons are normally generated during oxidation of hydrogen or organic acids. Access to these electrons occurs via the extracellular (periplasmic) redox protein cytochrome $c_3$.

Hydrogen is a very common fermentation end-product formed by most anaerobic, fermentative bacteria growing on a wide range of substrates from simple sugars to complex polysaccharrides. Thus hydrogen will normally be formed fermentativley in sediments by the diverse bacteria present (Odom J. M., et al., (ed) *The Sulfate-Reducing Bacteria: Contemporary Perspectives.* Publisher: Springer-Verlag, (1992)) . The hydrogen so formed will then be utilized by hydrogen consuming sulfate-reducing bacteria by a well known ecological mechanism known as interspecies hydrogen transfer (Odom J. M., et al., (ed) *The Sulfate-Reducing Bacteria: Contemporary Perspectives.* Publisher: Springer-Verlag, (1992)). Due to the extremely high affinity of their hydrogenase enzyme for hydrogen, the sulfate-reducers are exceptional scavengers of hydrogen gas (Odom J. M., et al., (ed) *The Sulfate-Reducing Bacteria: Contemporary Perspectives.* Publisher: Springer-Verlag, (1992)). Thus, electrons generated from the fermentation of a wide range of organics are transmitted via hydrogen, through bacterial hydrogenase, to cytochrome $c_3$ where they are subsequently used to drive sulfate reduction (FIG. 1). The cells maintain the cytochrome $c_3$ in the reduced, state even at very low partial pressures of hydrogen. The maintenance of the cytochrome $c_3$ in a reduced state provides the electrons for the reduction of the tetrapyrrole catalysts in the instant invention (FIG. 1). The role of interspecies hydrogen transfer and fermentative bacteria in the process utilizing more complex reductants such as sugars is shown below.

Step 1. Fermentation

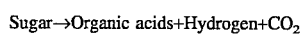

Sugar→Organic acids+Hydrogen+$CO_2$

Step 2. Growth of sulfate-reducing bacteria by utilization of fermentative hydrogen.

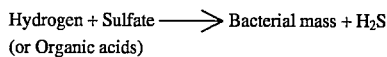

Hydrogen + Sulfate ⎯⎯→ Bacterial mass + $H_2S$
(or Organic acids)

Step 3. Dechlorination by sulfate-reducing bacteria+Catalyst using fermentatively formed hydrogen.

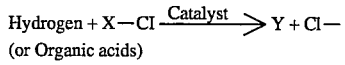

Hydrogen + X—Cl ⎯Catalyst→ Y + Cl—
(or Organic acids)

The present invention also provides a tetrapyrrole catalyst capable of reductive dehalogenation of organohalogens. Suitable tetrapyrroles may include but are not limited to porphyrins, such as hematin, corrins such as vitamin B12 (cyanocobalamin), phthalocyanines, and various bacterial factors such as F430. Cyanocobalamin and hematin are preferred.

Tetrapyrroles share similarities in structure in that they are all large cyclic metal-chelating amines comprising four pyrrol rings. Porphyrins contain the ring structure corresponding to formula I:

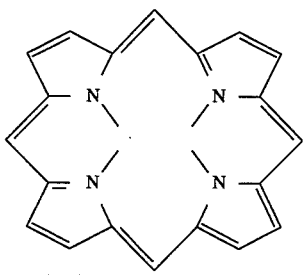

Formula I

A number of porphyrin ring systems exist in nature, including, for example protoporphryin, hematoporphyrin, uroporphyrin and coproporphyrin (WO 8910772).

Corrins are comprised of ring system similar to the porphyrin, differing in the position of the double and single bonds and contain one less carbon in the ring systems. The basic corrin ring structure is illustrated in Formula II:

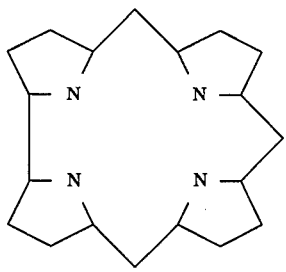

Formula II

Phthalocyanines vary still more from the porphyrin ring system and all comprise the structure illustrated by formula III:

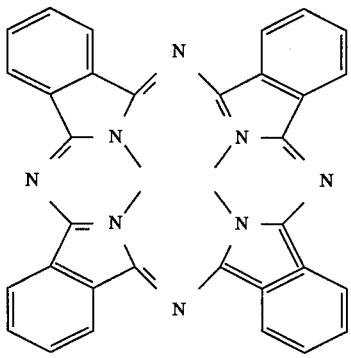

Formula III

In porphyrin, corrin and phthalocyanine ring systems one or more of the central nitrogen atoms may be bonded to one or more hydrogen atoms or all four may be coordinated to a central metal atom which may itself be additionally complexed with one or more other ligands. Heme, hematin and hemin are all examples of iron containing porphyrins. Chlorophyll is an example of a magnesium centered porphyrin. Vitamin B12 (cyanocobalamin) is an example of a cobalt centered corrin. Other known cobalt centered corrins include dicyanocobalamin, hydroxycobalamin, adenosylcobalamin and cobaloximes (WO 8910772).

The present invention further provides an electron transfer mediator capable of facilitating the transport of electrons from the cytochrome $c_3$ reductant to the tetrapyrrole catalyst for the purpose of reductive dehalogenation of organohalogens. There are many materials known in nature and in the art that facilitate such transport. Flavins, encompassing the flavoproteins and flavin nucleotides are one such class of materials. The flavins have in common an isoalloxazine ring system, which is responsible for electron transport and is illustrated in formula IV:

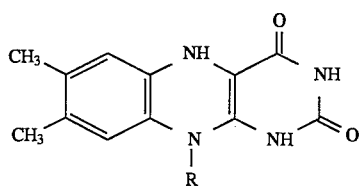

Formula IV

In nature flavoproteins function in the oxidative degradation of pyruvate, fatty acids, amino acids and also in the process of electron transport. Flavoproteins may be complexed with nucleotides to form flavin nucleotides. Examples of typical flavin nucleotides include flavin adenine dinucleotide (FAD), which is the result of a complex between riboflavin and an adenine base, and flavin mononucleotide (FMN), which represents the reduced form of FAD. Flavin nucleotides undergo reversible reduction of the isoalloxazine ring in the catalytic cycle to yield reduced flavin nucleotides, symbolized FMNH2 and FADH2. In nature many dehydrogenase and oxidase enzymes are complexed to flavins and rely on the isoalloxazine ring for their ability to react with electron acceptors. Although some flavoproteins shuttle between fully oxidized and fully reduced forms by simultaneous two-electron transfers, others appear to transfer only one electron at at time in their catalytic cycle and thus can split electron pairs. For the purposes of the present invention suitable electron transfer mediators comprise flavins, including flavoproteins and flavin nucleotides, where riboflavin is most preferred. It should be noted that although the electron transfer mediator enhances the rate of dehalogenation of organohalogens, it is not an absolute requirement for the coupling of the electron transport protein to the tetrapyrrole catalyst.

In a preferred embodiment of the invention, sulfate-reducing bacteria cells are incubated in the presence of an electron mediator and a tetrapyrrole catalyst to effect the dechlorination of various chlorinated solvents. Suitable cells comprise members of the Desulfovibrio genus and include *Desulfovibrio gigas* ATCC 19364, *Desulfovibrio desulfuricans* ATCC 27774, *Desulfovibrio desulfuricans* Norway, *Desulfovibrio desulfuricans* G100A and *Desulfovibrio salexigens* ATCC 14822. Stock solutions of cells were prepared by growing cells in standard media containing sodium lactate as a carbon source and sodium sulfate as an electron acceptor at 30° C. to a density of $10^9$ cells/mL. Cells were concentrated in distilled water to a concentration of about $10^{10}$ cells/ml and used for dechlorination experiments. Cells from the stock solution were mixed with a solution containing riboflavin (electron transfer mediator) and cyanocobalamin (tetrapyrrole catalyst) and gassed with 100% hydrogen gas for 30 minutes prior to the addition of carbon tetrachloride. Final concentrations of carbon tetrachloride were on the order of 5 μM. Reactions were monitored for time period of hours to days. Analysis of chlorinated compounds was performed by gas chromatography by standard methods on a Hewlett-Packard 5890 gas chromatograph using helium as the carrier gas.

In another preferred embodiment of the invention, sulfate-reducing bacteria cells are incubated in the presence of only tetrapyrrole catalyst to effect the dechlorination of various chlorinated solvents. Although the dechlorination proceeds at a reduced rate, this highly unexpected aspect of the invention demonstrates that dechlorination is able to proceed in the absence of an electron transfer mediator.

To illustrate this embodiment, cultures of sulfate-reducers were were grown up and incubated in the presence of the tetrapyrrole hematin, with and without riboflavin. All reaction mixtures were incubated as above for 30 min under 100% hydrogen and then the reaction was started with 3 ul of $CCl_4$. Samples were taken for gas chromatographic analysis over several hours and processed for the conversion of carbon tetrachloride ($CCl_4$) to chloroform ($CHCl_3$). Data, shown in Tables IV and V (Example 3) indicate that hematin alone is sufficient to drive the dechlorination reaction.

In another embodiment of the invention dechlorination of chlorinated solvents may be accomplished in vitro by the coincubation of a reaction mixture containing bacterial hydrogenase, purified cytochrome $c_3$, an electron transfer mediator and a tetrapyrrole catalyst. In a preferred embodiment the electron transfer mediator was riboflavin and the tetrapyrrole was either hematin or cyanocobalamin. As with the in vivo embodiment the reaction mixture was gassed with 100% hydrogen for 30 minutes before the addition of carbon tetrachloride. Rates of dechlorination were determined on the basis of the conversion of carbon tetrachloride to chloroform by gas chromatographic analysis using standard methods. The in vitro embodiment allows for the transfer of electrons from hydrogen to B12 for the dechlorination of a solvent.

Methods for the purification of cytochrome $c_3$ are known in the art. Techniques generally involve a combination of chromatographic steps employing both hydrophobic interaction, gel filtration, and ion exchange resins, (Moura I., et al., *Eur. J. Biochem*, 162, 547 (1987); Ziomek, E., et al., *Prep. Biochem.*, 14, 75 (1984)) although Eng L., et al., *Arch Microbiol.*, 153, 60 (1992) detail a method involving only one chromatographic step. A preferred method for the purification of Cytochrome $c_3$ to electrophoretic homogeneity from *D. gigas* was followed essentially as described by Van der Westen, et al., *FEBS Lett.*, 86, 122 (1978) herein incorporated by reference. Briefly, cells were homogenized and cell extract was made to 60% ammonium sulfate and subjected to chromatography on phenyl sepharose followed by DE-52 cellulose ion exchange. This procedure yielded a highly purified product, based on optical absorption ratio at 550 nanometers and 280 nanometers, which lacked any dechlorination activity and was suitable for use in the in vitro experiments.

The hydrogenase enzyme of the sulfate-reducing bacteria is responsible for the oxidation of hydrogen for the purpose of sulfate reduction. Method for the purification of bacterial hydrogenase are known in the art and generally involve a combination of ion exchange, gel filtration and affinity or hydrophobic interaction chromatography (Doherty, G., et al. *Biochem. Soc. Trans.*, 15, 301 (1987); Pusheva M. A., et al., *Prikl. Biokhim. Mikrobiol.*, 23, 185 (1987). Methods involving initial fractionation with ammonium sulfate or polyethylene glycol (PEG) are also known (Arp. D., et al., *Biochem. Biophys. Acta.*, 570, 221 (1979)). For the purposes of the present invention hydrogenase was partially purified by washing whole cells of *D. gigas* with Tris-EDTA buffer essentially as described by Van der Westen et al., *FEBS Lett.*, 86, 122 (1978) herein incorporated by reference. After dialysis the protein was partially purified by absorption onto an ion exchange column and eluted in 100 mM Tris buffer. Hydrogenase was determined to be free of cytochrome $c_3$ by spectrophotometric analysis of dithionite reduced samples. These samples were shown to lack the 550 nm absorbance considered diagnostic of the presence of reduced cytochrome $c_3$.

In another embodiment the present invention provides a method for the dechlorination of chlorinated solvents where the reductant is indirectly supplied to the sulfate-reducers in the form a metabolite of a coexisting fermentive bacterial species.

Mixed cultures of an obligate anaerobe (Clostridia sp.) and sulfate-reducers were grown under anaerobic conditions in the presence of glucose as the only carbon source. Glucose is a common carbon source for Clostridia but cannot be utilized by the sulfate-reducers. Under these conditions Clostridia are seen to utilize the glucose and produce hydrogen as a byproduct. The metabolic coexistence of fermentive and sulfate-reducing bacteria is well known in the art as the process of interspecies hydrogen transfer and is fully described in (Odom J. M., et al., (ed) *The Sulfate-Reducing Bacteria: Contemporary Perspectives.* Publisher: Springer-Verlag, (1992)).

Figure 2:
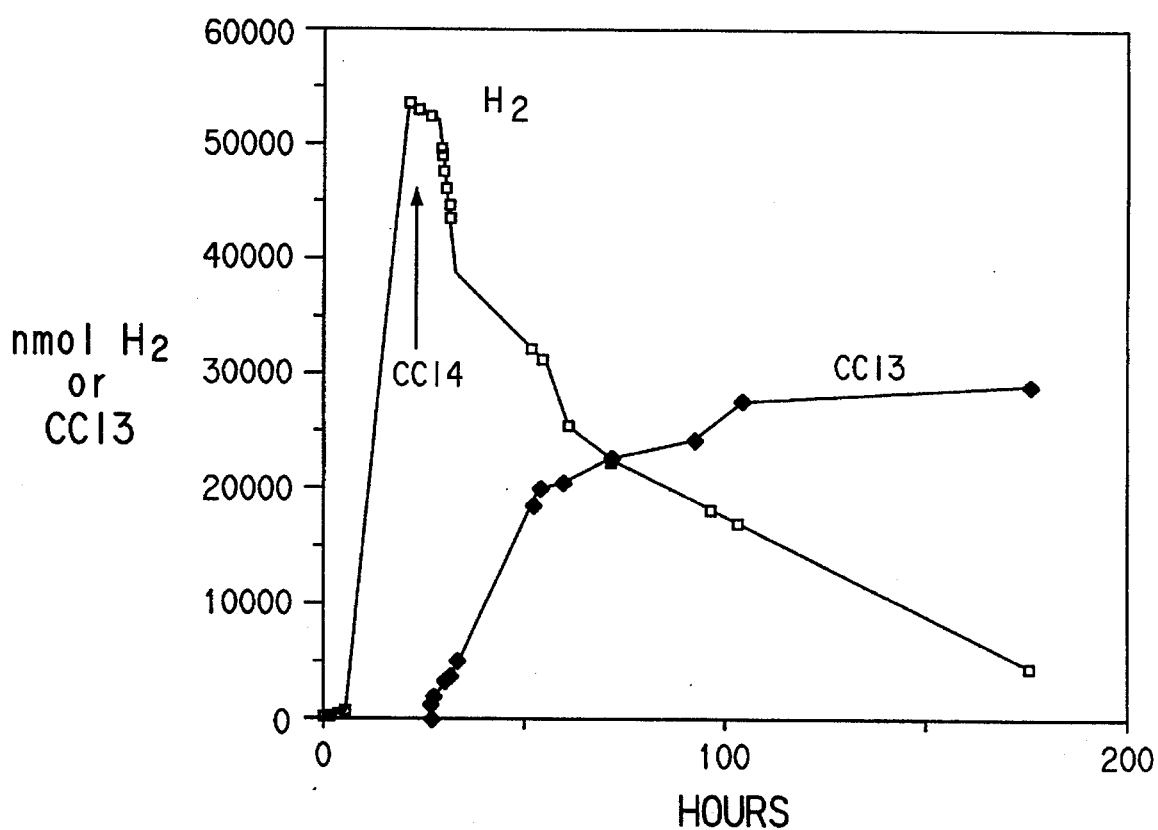
FIG. 2 is a graphic illustration showing the use of hydrogen, produced by fermentive bacteria, by sulfate-reducers to dechlorinate $CCl_4$ in the presences of B12 and riboflavin.

When the mixed cultures demonstrated evidence of sulfide production, cells from the cultures were tested for their ability to dechlorinate solvents. Reaction mixtures were prepared which contained cells from the mixed culture, a tetrapyrrole (cyanocobalamin), and an electron transfer mediator (riboflavin). This reaction mixture was tested for it's ability to dechlorinate $CCl_4$. Data, illustrated in FIG. 2, shows that hydrogen is evolved from glucose until the carbon tetrachloride is added at which time hydrogen is taken up and used to reduce carbon tetrachloride to chloroform by the Desulfovibrio-tetrapyrrole complex.

The present invention additionally provides a method of in situ remediation of organohalogen contaminated soil and groundwater. Conventional technology for managing groundwater which has become contaminated with pollutants such as organohalogens may be categorized into four categories: (1) containment of the contaminants using either physical barriers (i.e., slurry cutoff walls or sheet pilings) or hydraulic barriers created by a system of injection and pumping wells; (2) pumping of the contaminated groundwater to a treatment process at the surface, followed by disposal or reuse of the treated water; (3) removal of contaminated soil, with subsequent soil treatment or disposal; and (4) in-place stabilization of aquifer contaminants. Frequently, in practice, a combination of one or more of these alternatives is used, e.g., excavation of the most highly contaminated soil combined with a pump-and-treat process for contaminated groundwater. Several of these methods are disclosed in U.S. Pat. No. 5,057,227 herein incorporated by reference.

Generally conventional pump and treat methods rely on a complex system of trenches, injection wells, monitoring wells and recirculation wells optionally in combination with an above-ground treatment facility, such as those described in Jhaveri U.S. Pat. No. 4,401,569 herein incorporated by reference. Typically, wells serving various functions are drilled into a contaminated aquifer. Injection wells for the introduction of nutrients into the groundwater are drilled upstream of the contamination plume, while monitoring wells for the analysis of the aquifer for the levels of contaminates and bacterial metabolic products are placed downstream of the injection wells. The number and spacing of the wells is site specific and dependent on a number of factors including the size of the area to be remediated, the rate of aquifer flow and the level of contamination.

In general an in-depth assessment of the site is needed to determine the problems to be overcome before remediation can begin. Concentration of the contaminant is important as well as an evaluation of the regulatory limit and time allowable for remediation. This becomes a factor when considering the cost and feasibility of remediation in this manner. Presence of other materials requiring remediation and their effect on the enhanced indigenous microbial population as well as recommended human exposure levels, and environmental risks associated with their presence and handling are also factors to be considered. Included in the initial assessment of the site must be the evaluation of various physical and chemical characteristics of the contaminated media. The media must be capable of supporting enhanced microbial growth or be made capable of doing so. Various aspects of soil and water chemistry will also affect the effectiveness of the remediation process and preferred conditions will maximize both the growth rate of the indigenous microbes and the bio-availability of the pollutants to be remediated. In general it is preferred if the pH of the soil or ground water is in a range of pH 5–pH 8. Phosphate is a requirement for most microbial populations. Soil or ground water may be amended to maintain phosphate concentrations at levels compatible with steady state microbial growth. Addition of phosphate, however, must be monitored since, high levels may produce microbial plumes that will decrease the permeability of the soil. Several reviews of many of the standard pump and treat methods of bioremediation are described in: *Site Characterization for subsurface remediation.* EPA Seminar Publication. EPA/625/4-91/026 (November 1991). U.S. EPA Office of Research & Development Washington DC., *The Superfund Inovative Technology Program:* Technology Profiles Fifth Edition. EPA/540/R-92/077 (November 1992). U.S. EPA Office of Solid Wastes and Emergency Responses. Washington, DC 20460; U.S. Pat. No. 4,832,122; *Moving Beyond Pump-and-Treat.,* Ann Hasbach (1993). Pollution Engineering. March 15, 1993 and *Remediation of Contaminated Sediments,* EPA Handbook, EPA/625/6-91/028 (April 1991).

It is contemplated that in situ bioremediation via, tetrapyrrole-catalyzed reductive dechlorination could be practiced by a two step process. The first step would encompass the addition of fermentable substrates and low amounts of sulfate to sediment to generate populations of fermenting bacteria and sulfate-reducing bacteria. This is a natural and spontaneous process which occurs in most bioremediation efforts as currently practiced. The second step would involve the addition of tetrapyrrole and mediator, tetrapyrrole-mediator complex or a tetrapyrrole to sediment which will couple directly to cytochrome $c_3$ to carry out reductive dechlorination.

It would be expected that low potential electrons produced during anaerobic metabolism would be made available for tetrapyrrole catalysis. In subsurface environments fermentive bacteria are ubiquitous and would provide reducing equivalents for this catalysis. In the sulfate reducing bacteria low potential electrons derived from hydrogen oxidation are of central importance in the metabolism of the cell. The sulfate-reducers contain the extracellular, low potential (−300 mV) cytochrome $c_3$ which will, by virtue of its localization on the cell surface, and mid-point potential, couple to tetrapyrrole catalysts.

The present invention teaches the novel finding that reductive dechlorination by a chemical catalyst (tetrapyrrole) can be coupled via extracellular electron transfer to the electron transfer chain of an intact microorganism. The consequence of this finding is that nondechlorinating anaerobes can now participate in reductive dechlorination via normal metabolic processes and extracellular electron transfer to the catalyst. In the case of the sulfate-reducing bacteria low potential electrons are normally generated during oxidation of hydrogen or organic acids. Access to these electrons occurs via the extracellular (periplasmic) redox protein cytochrome $c_3$. The requirement of the chemical catalyst for a strong reductant is met in this scheme in an environmentally acceptable way without addition of high concentrations of reducing chemicals to the groundwater. It should also be noted that hematin and B12 are naturally-occurring compounds.

The present method further discloses that cells of *Desulfovibrio*, riboflavin and either a cobalt-containing (cyancobalamin) or an iron-containing (hematin) tetrapyrrole will dechlorinate using hydrogen, pyruvic or lactic acids as the source of electrons. Hydrogen is a commonly produced byproduct of fermentive bacteria and is able to serve as a ready substrate for sulfate-reducers. The high affinity of the sulfate-reducing hydrogenase enzyme for hydrogen results in the maintenance of the cytochrome $c_3$ and the dechlorinating catalyst in the active, reduced, state even at very low partial pressures of hydrogen. Consequently, only low concentrations of fermentable substrates (i.e., sugar, yeast extract, etc. ) need be present to drive the electron transfer process.

The following examples are to used to illustrate the present invention but should not be construed as limiting it in any way.

EXAMPLES

General Methods

Cultivation of Organisms

A growth medium employing sodium lactate as carbon source and sodium sulfate as electron acceptor was used to grow sulfate reducing bacteria as described by Odom et al, *Appl. Environ. Microbiol.* 57, 727 (1991) herein incorporated by reference. The strains of sulfate-reducing bacteria *Desulfovibrio gigas,* ATCC 19364 *Desulfovibrio desulfuricans* ATCC 27774, *Desulfovibrio desulfuricans* Norway, *Desulfovibrio desulfuricans* G 100A and *Desulfovibrio salexigens* ATCC 14822 were obtained from the laboratory of Dr. H. D. Peck, Department of Biochemistry, University of Georgia, Athens, Ga. 30601. Materials having ATTC designations are deposited with the American Type Culture Collection, 12391 Packlawn Dr., Rockville, Md., USA 20852. Cultures were grown overnight and the cells collected by centrifugation at 20,000×g for 20 minutes. For dechlorination assays, cell suspensions were concentrated at least ten fold by centrifugation and then resuspension in a reduced volume of distilled water.

Purified proteins

Hydrogenase was partially purified by washing whole cells of *D. gigas* with pH 9 Tris-EDTA buffer essentially as described by Van der Westen et al., FEBS Lett. 86, 122 (1978) herein incorporated by reference. The pH 9 Tris-EDTA cell wash was dialyzed overnight against two, 20 fold dilutions of distilled water. The protein was partially purified by absorption onto Whatman DE 52 (4.5 cm×10 cm) column preequilibrated with 10 mM Tris pH 8. The column was washed successively with 10 mM Tris, 100 mM Tris and 500 mM Tris. The hydrogenase eluted in the 100 mM Tris fraction and was determined to be free of cytochrome $c_3$ by spectrophotometric analysis of dithionite reduced samples.

Cytochrome $c_3$ was purified to electrophoretic homogeneity from *D. gigas* by first extracting the cytochrome from 20 g of whole cell paste with pH 9 Tris-EDTA as described by Van der Westen et al., *FEBS Lett.* 86, 122 (1978) herein incorporated by reference. The extracted cytochrome was adjusted to 60% of saturation with ammonium sulfate in 25 mM HEPES buffer pH 7 and loaded onto a phenyl sepharose column (2.5 cm×10 cm). The column was washed with 25 mM HEPES pH 7 at 10% ammonium sulfate saturation and the cytochrome was eluted 25 mM HEPES pH 7. The cytochrome was then applied directly to a Whatman DE 52 column equilibrated with 25 mM HEPES pH 7. The column was washed with the equilibration buffer and the protein eluted with 25 mM HEPES 100 mM NaCl.Spectrophotometric analysis of the resulting product was done at 550 nm according to the protocol described by Moura, I., et al., *Eur. J. Biochem.*, 176, 365 (1988) herein incorporated by reference.

Gas Chromatographic analyses

Analysis of carbon tetrachloride (Aldrich Chemical Co.) and chloroform were performed on a Hewlett-Packard 890 gas chromatograph fitted with an HP-5 column and flame ionization detector. The analytical method consisted of a 15 deg/min temperature gradient from 35°–150° C. 200° C. detector temperature, 150° C. injector temperature. Carrier gas was helium at 50 mL/minute. Samples consisted of upto 100 ul of gas headspace containing the volatile pollutant.

Determination of hydrogen production was accomplished using a Hewlett-Packard 5888 gas chromatograph fitted with an PoraPak Q column and a thermal detector. The analytical method consisted of a 15 deg/min temperature gradient from 80°–150° C. where the carrier gas was argon.

EXAMPLE 1

In vitro dechlorination of $CCl_4$ using purified proteins and cyanocobalamin

Example 1 demonstrates the in vitro dechlorination of $CCl_4$ to $CH_3Cl_3$ in the presence of purified cytochrome $c_3$ from *D. gigas* and hydrogenase using riboflavin as an electron transfer mediator and cyanocobalamin as the tetrapyrrole catalyst. Since hydrogenase is the natural electron donor to cytochrome $c_3$ in the sulfate-reducers purified hydrogenase was used to reduce the cytochrome. Hydrogenase and cytochrome $c_3$ were purified as described above. An incubation mixture of hydrogenase, 50 ul; cytochrome $c_3$ (12 nmol/mL) 150 ul; Riboflavin (1 mM), 100 ul; and either cyanocobalamin or hematin (1 mM) 100 ul; was made in HEPES buffer pH 7.5 for a total volume of 2 mL. The reaction mixture was gassed with hydrogen for 30 minutes and then 3 ul of carbon tetrachloride was added to start the reaction. After gassing, the mixture was incubated for 20.3 hours at 30° C. with gentle agitation. Gas phase samples were taken for gas chromatographic analysis of carbon tetrachloride ($CCl_4$) and chloroform ($CHCl_3$) as described above. Data demonstrating the dechlorination of $CCl_4$ to $CHCl_3$ is shown in Table I.

TABLE I

| Component | $CHCl_3$* | $cCl_4$ |
|---|---|---|
| Hydrogenase + $C_3$ | 117 | 28556 |
| Hydrogenase + $C_3$ + B12 | 26 | 28788 |
| Hydrogenase + $C_3$ + Hematin | 289 | 28114 |
| Hydrogenase + $C_3$ + Riboflavin | 267 | 25893 |
| Hydrogenase + $C_3$ + Riboflavin + B12 | 12737 | 10742 |
| Hydrogenase + $C_3$ + Riboflavin + Hematin | 3845 | 23189 |

*nmol chloroform produced after 20.3 hours of incubation.

The data shown in Table I indicate that dechlorination of $CCl_4$ to $CHCl_3$ was greatly accelerated when both riboflavin and a tetrapyrrole were present in the reaction mixture. The tetrapyrrole could be cobalt-containing (cyanocobalamin, B12) or iron-containing (hematin). Riboflavin, B12, or hematin alone produced produced levels of chloroform too low to be significant in the time course of this experiment. The effect of these catalysts alone will be further investigated in the following experiments. Although low levels of chloroform were detected in all reaction mixtures, dechlorination at levels 30–100 fold higher than hydrogenase+$C_3$ were observed when both riboflavin and the tetrapyrrole were present. These results can only be explained by the electron transfer sequence shown above where riboflavin serves as an electron transfer mediator between cytochrome $C_3$ and the tetrapyrrole. Hydrogen gas is the ultimate reductant for the reaction.

EXAMPLE 2

Dechlorination of carbon tetrachloride using *D. gigas* bacterial cells and hydrogen as reductant Effect of *D. gigas*, cell number Example 2 illustrates the dechlorination of $CCl_4$ to $CHCl_3$ using whole cells of a single sulfate-reducing species, *D. gigas*. Culture of *D. gigas* were grown as described above. After reaching a cell density of 109 cells/ml were collected by centrifugation and resuspended in distilled water at a concentration of approximately $10^{10}$ cells/ml and used as a stock solution. Four reaction mixtures were prepared by adding either 10 ul, 50 ul, 200 ul or 1000 ul of cell stock solution to a mixture containing Riboflavin 1 mM, 100 ul; cyanocobalamin 1 mM, 100 ul all in HEPES buffer pH 7.5 and made to a final volume of 2 ml. As in Example 1 the mixtures were gassed with hydrogen for 30 minutes and the reaction started with 3 ul of carbon tetrachloride. After 22 hours gas phase samples were taken for gas chromatographic analysis of carbon tetrachloride ($CCl_4$) and chloroform ($CHCl_3$) as described above. Data demonstrating the dechlorination of $CCl_4$ to $CHCl_3$ using varying amounts of *D. gigas* cells is shown in Table II.

TABLE II

| Volume of D. gigas | nmol $CHCl_3$* |
|---|---|
| 10 | 0 |
| 50 | 21 |
| 200 | 348 |
| 1000 | 2469 |

*Product formed after 22 hours incubation.

The results illustrated in Table II clearly show a dependence of total product formed on the number of cells in the presence of fixed amount of riboflavin and cyanocobalamin.

Effect of cyanocobalamin concentration

In order to determine the effect of concentration of tetrapyrrole catalyst on the rate of dechlorination, reaction mixtures containing 1000 ul of *D. gigas* cells, and 100 ul of 1 mM riboflavin were prepared where the concentration of cyanocobalamin was varied. Four reaction mixtures were prepared containing either 0, 20 ul, 50 ul, 100 ul, or 200 ul of 1 mM cyanocobalamin. All reaction mixtures were incubated as above for 30 min under 100% hydrogen and then the reaction was started with 3 ul of $CCl_4$. All reactions were stopped after 5 hours of incubation and samples were taken for gas chromatographic analysis of carbon tetrachloride ($CCl_4$) and chloroform ($CHCl_3$) as described above. Data demonstrating the effect of concentration of cyanocobalamin on the rate of is shown in Table III.

TABLE III

| μM cyanocobalamin | nmol CHCl$_3$* |
| --- | --- |
| 0 | 64 |
| 10 | 675 |
| 25 | 1375 |
| 50 | 2298 |
| 100 | 2786 |

*Product formed after 5 hour incubation

The data shown in Table III support the scheme that riboflavin is mediating electron transfer between the cytochrome $c_3$ on the cell surface and cyanocobalamin which carries out the catalysis. Additionally the data shown in Table III illustrate that cyanocobalamin can, like hematin, be an active part of the catalytic mechanism.

EXAMPLE 3

Dechlorination of carbon tetrachloride using *D. gigas* bacterial cells with and without an electron transfer mediator Example 3 demonstrates that dechlorination is able to proceed in the absence of an electron transfer mediator although at a reduced rate. Cultures of *D. gigas* cells were grown up as described above. Three reaction mixtures were prepared containing either 1 ml of cells, 1 ml of cells in 100 μM hematin, or 1 ml of cells with 100 μM hematin and 100 μM riboflavin. All reaction mixtures were incubated as above for 30 min under 100% hydrogen and then the reaction was started with 3 ul of CCl$_4$. Samples were taken for gas chromatographic analysis at 0, 1, 2, 3, 4, and 71 hr and processed for the detection of carbon tetrachloride (CCl$_4$) and chloroform (CHCl$_3$) as described above. Data demonstrating the rates of dechlorination for all time points is shown in Table IV.

TABLE IV

| Hours | Total nmol CHCl$_3$ | | |
| --- | --- | --- | --- |
|  | −Hm$^a$ | +Hm$^b$ | +RB + HM$^c$ |
| 0 | 0 | 0 | 94 |
| 1 | 0 | 146 | 3817 |
| 2 | 31 | 200 | 5119 |
| 3 | 44 | 241 | 6197 |
| 4 | 45 | 265 | 6742 |
| 71 | 17 | 383 | 8917 |

−Hm$^a$ - 1.0 ml of Whole cells of D. gigas under hydrogen.
+Hm$^b$ - Cells + 100 uM hematin
+RB + HM$^c$ - Cells + 100 uM hematin + 100 uM riboflavin It is evident from the data in Table IV that there is significant dechlorination of CCl$_4$ to CCl$_3$ in the presence of the tetrapyrrole catalyst alone, minus the electron transfer mediator. Addition of riboflavin is seen to enhance the rate of dechlorination approximately 25 fold.

To determine the relative effect of concentration of the tetrapyrrole on the rate of dechlorination in the absence of the electron transfer mediator *D. gigas* cells were grown up as described above and reaction mixtures were prepared containing either 0, 25 μM hematin, 125 μM hematin, 250 μM hematin and 250 μM hematin with 100 μM riboflavin. All reaction mixtures were incubated as above for 30 min under 100% hydrogen and then the reaction was started with 3 ul of CCl$_4$. Samples were taken for gas chromatographic analysis at 0, 1, 2, 3.4, 4.4, 18.9 and 91 hr and processed for the detection of carbon tetrachloride (CCl$_4$) and chloroform (CHCl$_3$) as described above. Data demonstrating the rates of dechlorination for all time points is shown in Table V.

TABLE V

| Hours | μM Hematin | | | | |
| --- | --- | --- | --- | --- | --- |
|  | 0 | 25 | 125 | 250 | 250 + RB* |
| 0 | 0 | 0 | 0 | 0 | 37 |
| 1 | 0 | 126 | 115 | 99 | 1242 |
| 2 | 26 | 140 | 190 | 163 | 1729 |
| 3.4 | 30 | 179 | 233 | 219 | 1852 |
| 4.4 | 39 | 187 | 266 | 247 | 1930 |
| 18.9 | 75 | 292 | 346 | 339 | 1879 |
| 91 | 111 | 360 | 370 | 250 | 1604 |

*100 μM RB Riboflavin

As can be seen by the data in Table V concentrations of hematin above 125 μM have little effect on the rate of dechlorination.

Tables IV and V show that hematin can couple directly to the cell in the absence of riboflavin. This is an important observation which shows that there is some electron flow from the cell to hematin and that this flow can be greatly stimulated by riboflavin. The stimulation with hematin alone saturates at around 25–125 μM hematin. Data from Table I–V demonstrate the requirement of tetrapyrrole, cells and riboflavin for dechlorination.

EXAMPLE 4

Dechlorination of CCl$_4$ by *D. gigas* using various carbon sources as electron donors In the dechlorination reaction described above hydrogen gas has served as the sole reductant for either the in vivo or in vitro hydrogenase system. Hydrogen is a good substrate due to its common formation as a fermentation end-product and thermodynamically because of the E' value of −400 mV. Organic acids also serve as good electron donors for growth of *D. gigas*. This example compares the relative abilities of sodium lactate (E'−190 mV), sodium pyruvate (E'−700 mV) and hydrogen (E'−400 mV) in driving cyanocobalamin catalyzed dechlorination.

*D. gigas* cell stock solution was prepared as described in Example 2. Three reaction mixtures were prepared by adding 1000 ul of cell stock solution to a mixture containing Riboflavin 1 mM, 100 ul; cyanocobalamin 1 mM, 100 ul all in HEPES buffer pH 7.5 and made to a final volume of 2 ml. One reaction mixture was gassed with 100% hydrogen for 30 minutes as described above. A second and third reaction mixture was made to either 30 mM sodium lactate or 30 mM sodium pyruvate and gassed for 30 minutes under 100% argon. As above, 3 ul of CCl$_4$ was added to each reaction mixture to begin the reaction. The reaction was terminated after 28 hours and gas phase samples were taken for gas chromatographic analysis of carbon tetrachloride (CCl$_4$) and chloroform (CHCl$_3$) as described above. Data demonstrating the dechlorination of CCl$_4$ to CHCl$_3$ using alternate carbon sources is shown in Table VI.

TABLE VI

| Substrate | nmol CHCl$_3$* |
| --- | --- |
| Hydrogen (100% gas phase) | 1440 |
| Sodium pyruvate | 1209 |
| Sodium lactate | 350 |

*Total product after 28 hours

The results shown in Table VI show that the low potential oxidations (hydrogen and pyruvate) allowed dechlorination to occur at a rate approximately 4 times faster than the higher potential lactate oxidation. This result suggests that the best substrats for driving the Desulfovibrio-tetrapyrrole dechlorinating system will be those with low potential (i.e., −200 to −400 mV). Hydrogen oxidation occurs at −400 mV. Hydrogen is an ecologically important and ubiquitous substance occurring as a microbial food chain intermediate in most sediments. Hydrogen may be derived from a wide range of organics as a result of fermentative activity by a wide variety of bacteria as described above.

EXAMPLE 5

Dechlorination by interspecies hydrogen transfer between *C. beijerinckii* and Desulfovibrio-tetrapyrrole complex Example 5 demonstrates that organics which are not directly utilized by Desulfovibrio may be fermented with hydrogen as a major end-product by non sulfate-reducing fermentative bacteria such as Clostridium sp. Clostridia are ubiquitous soil microorganisms which can be cultivated from most aquifers.

Cultures of both *D. desulfuricans* G100A and *Clostridium beijerinckii* were grown to densities of $10^{10}$ cells/ml for testing. *D. desulfuricans* G100A was grown according to the protocol outlined above for *D. gigas*. *Clostridium beijerinckii* (source, ATCC #) was grown anaerobically on BTZ-3 medium lacking sodium sulfate or sodium lactate and supplemented with 5 mM Glucose. Under these growth conditions the organism is known to ferment sugars to hydrogen, carbon dioxide and organic acids. (Gibson G. R., *J. Appl. Bacteriol.*, 69, 769 (1990)).

Reaction mixtures were prepared which contained; *C. beijerinckii* 4.0 ml; *D. desulfuricans* G100A (a sulfate-reducer) 4.0 ml; cyanocobalamin (1 mM), 400 ul; Riboflavin (1 mM), 800 ul; and Glucose (1 M) 46 ul. Reaction mixtures were gassed with 100% argon for 30 min. and reactions were started by addition of 9 ul $CCl_4$. Results showing hydrogen evolution and reuptake coincident with addition of carbon tetrachloride and chloroform appearance are shown in FIG. 2.

FIG. 2 shows that hydrogen is evolved from glucose until the carbon tetrachloride is added at which time hydrogen is taken up and used to reduce carbon tetrachloride to chloroform by the Desulfovibrio-tetrapyrrole complex.

EXAMPLE 6

Dechlorination by interspecies hydrogen transfer using aquifer sediments as bacterial source Example 6 demonstrates that naturally ocurring bacteria isolated from sediment samples from industrial sites contaminated with chlorinated solvents may be utilized to effect the dechlorination of these solvents with the addition of appropriate tetrapyrrole catalyses and electron transfer mediators.

Sediment samples from contaminated industrial sites in Victoria, Texas; Kinston, N.C.; and Niagara, N.Y. were used as inoculum for enrichments using glucose as sole carbon source in the presence of 20 mM sodium sulfate (sulfate-reducing conditions). The aquifer sediment samples were all obtained from areas contaminated with chlorinated solvents. It is well known that enrichments such as these comprise both glucose fermenting bacteria and sulfate-reducing bacteria.

Sediment samples were inoculated into BTZ-3 medium supplemented with 5 mM glucose and 20 mM sodium sulfate and incubated for 1 week at 30° C. under argon and monitored for the production of sulfide by the method as described by Siegal, L. M., Methods in Enzymology, 53d, 419 (1979), herein incorporated by reference. Cultures demonstrating sulfide production were considered to contain actively growing sulfate-reducing bacteria since sulfate-reducers cannot utilize glucose and therefore sulfide production can only occur via sulfate-reducing metabolism of breakdown products generated by fermentative bacteria.

Cultures demonstrating sulfide production were used in reaction mixtures for dechlorination experiments. Reaction mixtures consisted of 1 ml of cells (cell densities estimated at $\approx 10^9$ cells/ml, 100 uM cyanocobalamin, 100 uM riboflavin, 5 mM Glucose, phosphate buffer pH 7 25 mM. Reactions were started by addition of 1.5 ul of carbon tetrachloride and samples were harvested at periodic intervals from 0 to 120 hr and analyzed for the formation of chloroform and hydrogen as described above. Data demonstrating the dechlorination of $CCl_4$ by the sulfate-reducers in response to elevated hydrogen production from the fermentive bacterial component is illustrated in FIGS. 3, 4, and 5.

Figure 3A:
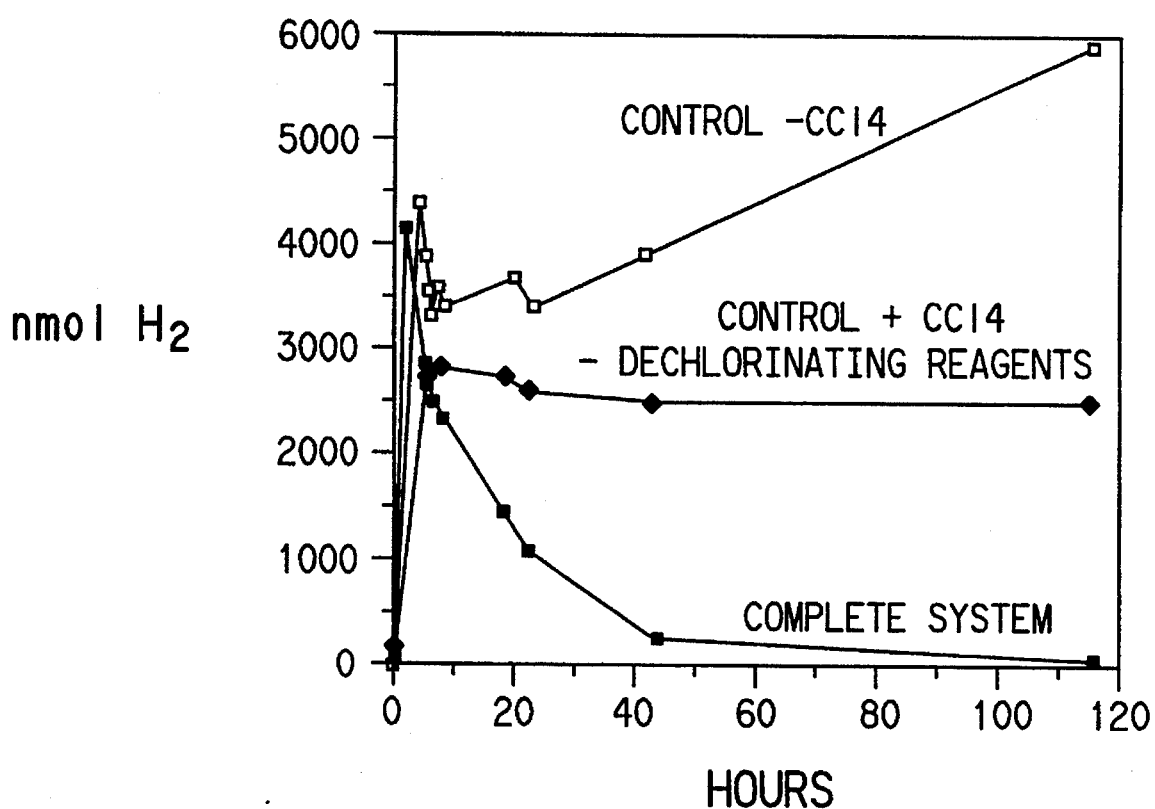
FIG. 3a is a plot of $H_2$ evolution over time as a measure of the rate of dechlorination of $CCl_4$ to $CCl_3$ by bacterial cultures obtained from an industrial site in Texas, in the absence or presence of reductants and electron transfer mediators.
Figure 3B:
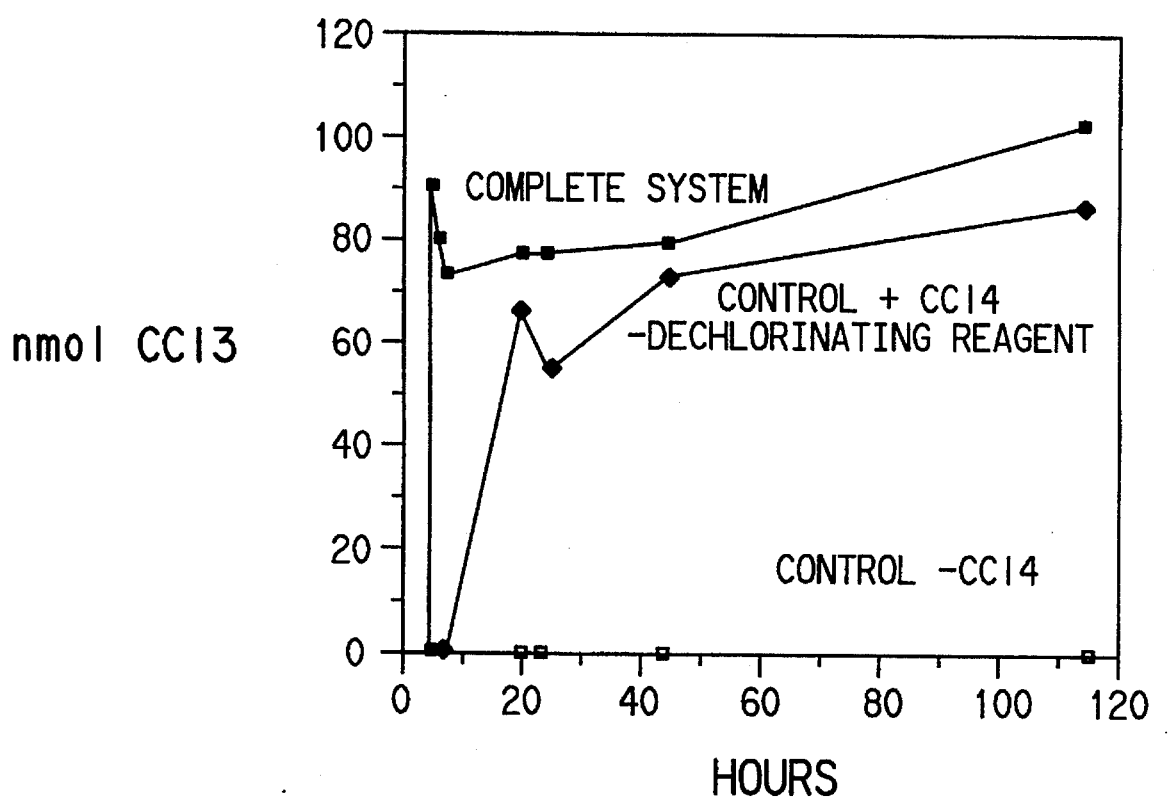
FIG. 3b is a plot of $CCl_3$ evolution over time as a measure of the rate of the dechlorination of $CCl_4$ to $CCl_3$ by bacterial cultures obtained from an industrial site in Texas, in the absence or presence of reductants and electron transfer mediators.
Figure 4A:
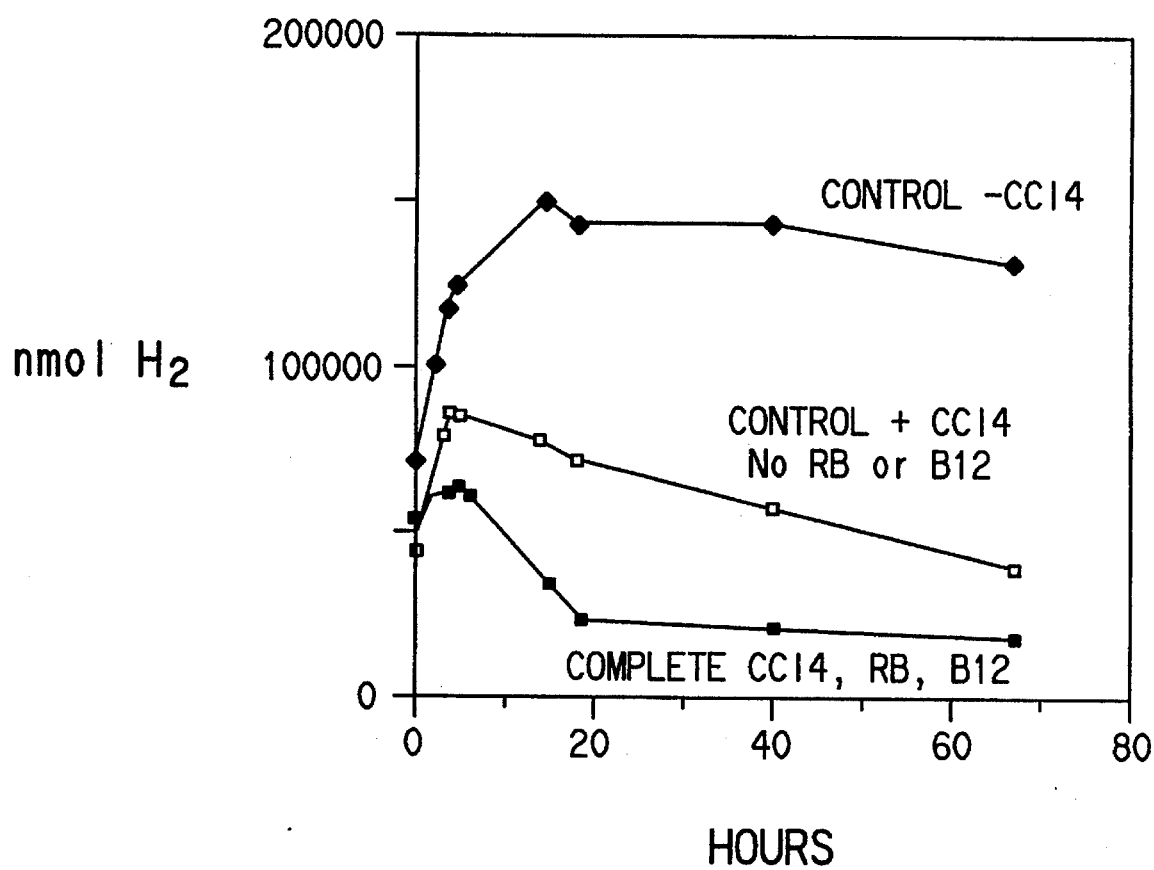
FIG. 4a is a plot of $H_2$ evolution over time as a measure of the rate of the dechlorination of $CCl_4$ to $CCl_3$ by bacterial cultures obtained from an industrial site in New York, in the absence or presence of reductants and electron transfer mediators.
Figure 4B:
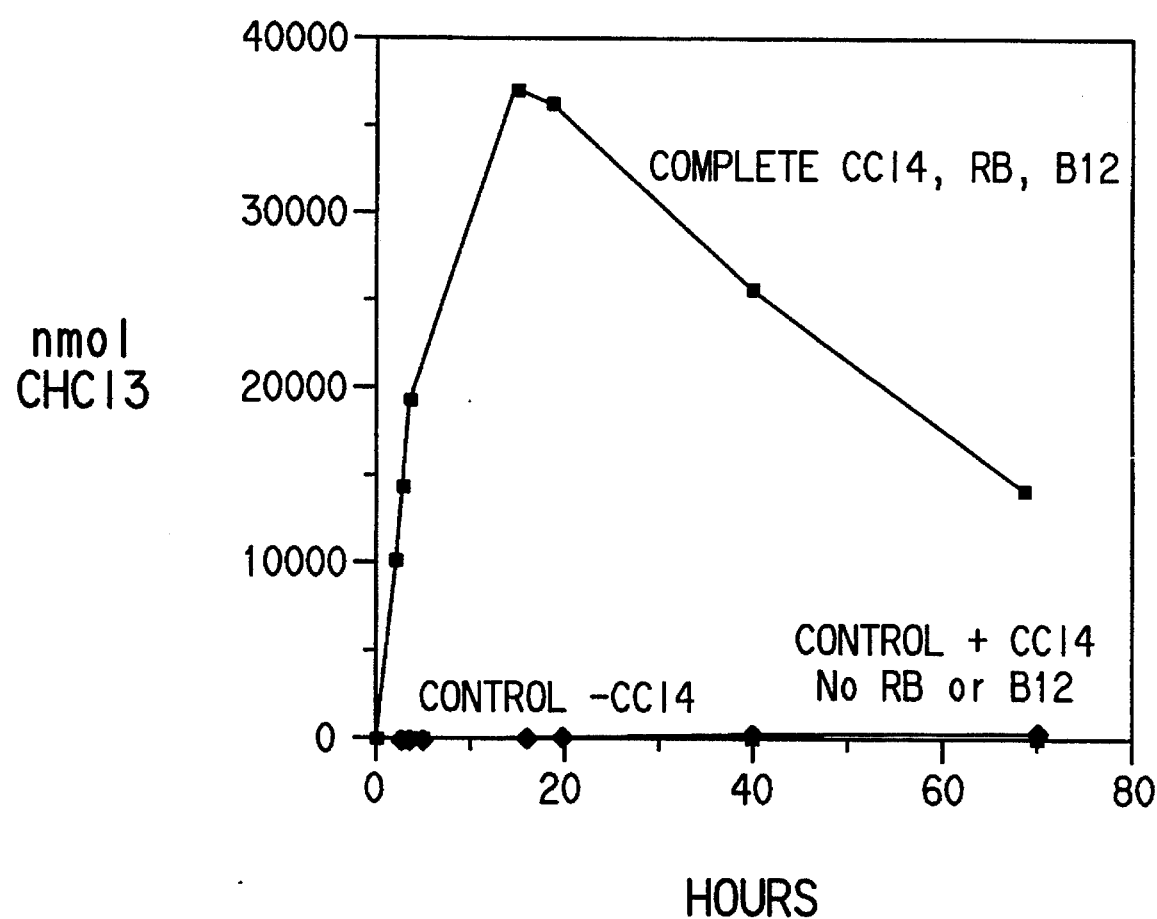
FIG. 4b is a plot of $CCl_3$ evolution over time as a measure of the rate of the dechlorination of $CCl_4$ to $CCl_3$ by bacterial cultures obtained from an industrial site in New York, in the absence or presence of reductants and electron transfer mediators.
Figure 5A:
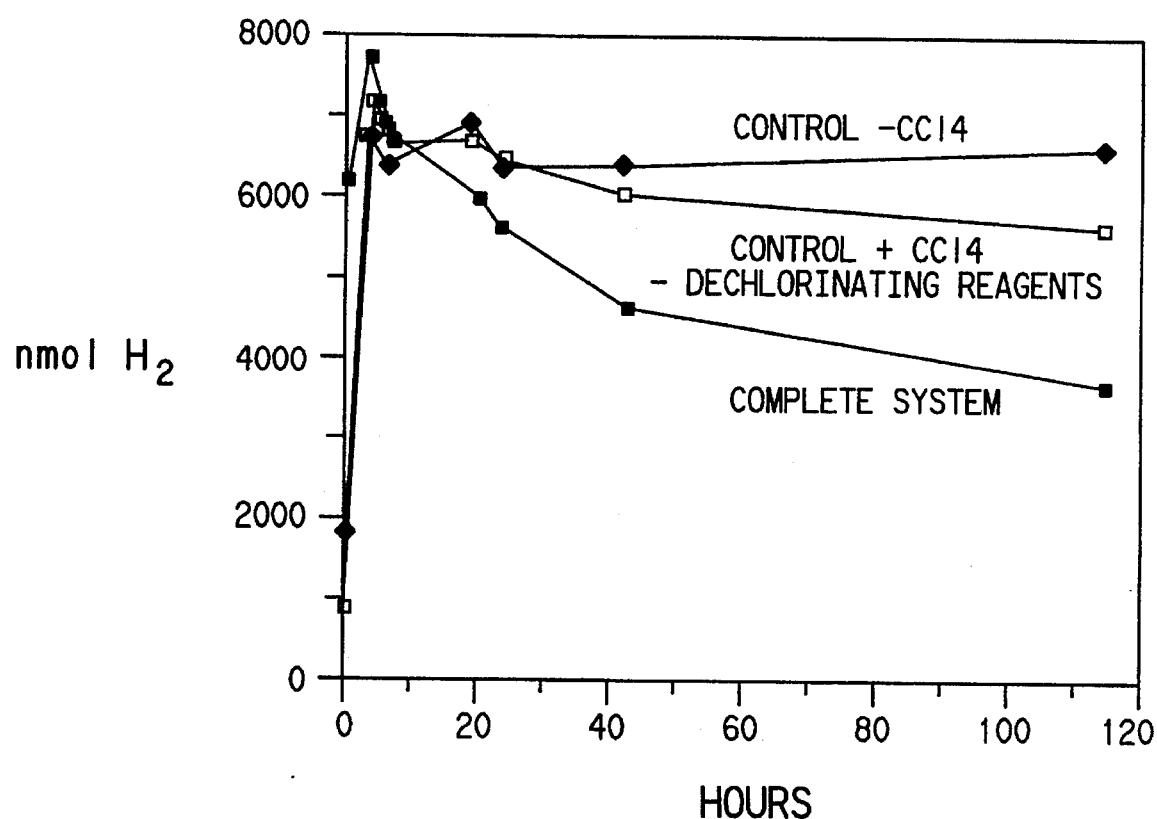
FIG. 5a is a plot of $H_2$ evolution over time as a measure of the rate of the dechlorination of $CCl_4$ to $CCl_3$ by bacterial cultures obtained from an industrial site in North Carolina, in the absence or presence of reductants and electron transfer mediators.
Figure 5B:
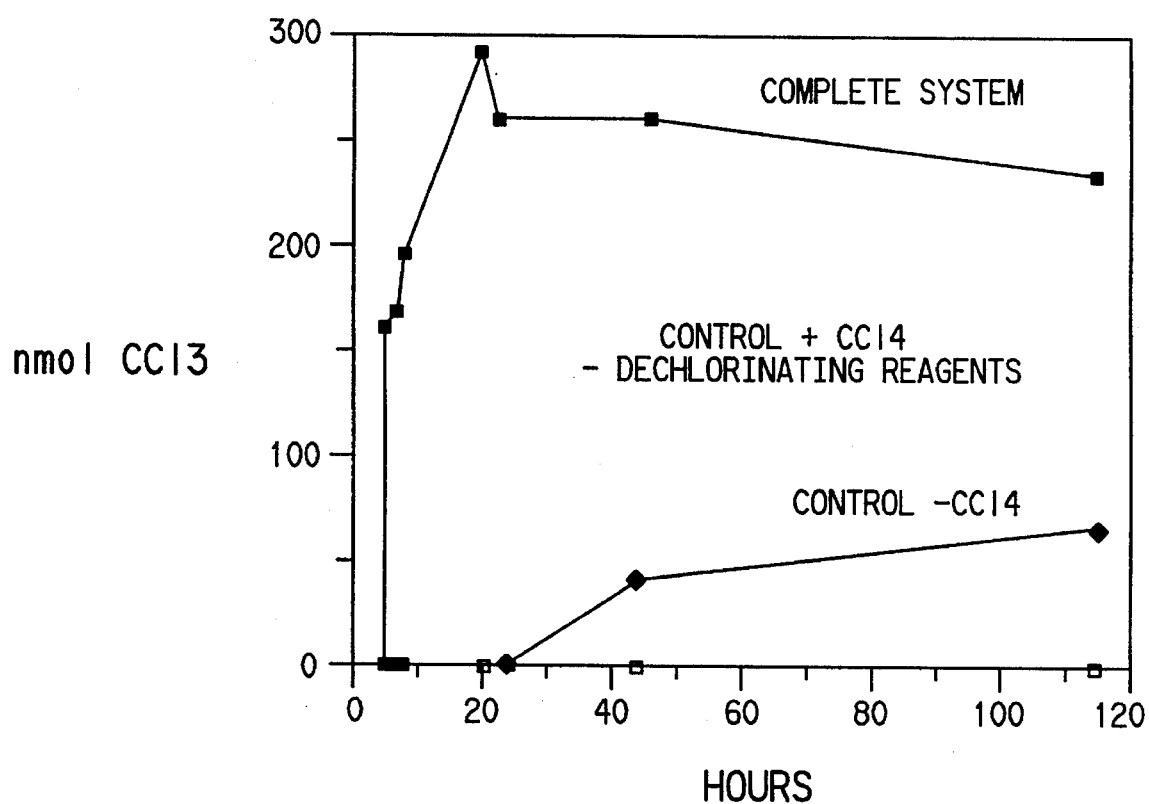
FIG. 5b is a plot of $CCl_3$ evolution over time as a measure of the rate of the dechlorination of $CCl_4$ to $CCl_3$ by bacterial cultures obtained from an industrial site in North Carolina, in the absence or presence of reductants and electron transfer mediators.

As illustrated in each of FIGS. 3, 4, 5 a crude enrichment of bacteria from a contaminated aquifer was shown to rapidly produce hydrogen by glucose fermentation. A carbon tetrachloride dependent hydrogen uptake was observed which was greatly enhanced by the presence of the Riboflavin-cyanocobalamin mixture. As shown in FIG. 3, hydrogen production continued in the absence of carbon tetrachloride whereas in the presence of carbon tetrachloride, hydrogen production appeared flat after an initial burst, indicative of equal rates of production and consumption. In the presence of both carbon tetrachloride and the riboflavin-cyancobalamin mixture rapid reuptake of hydrogen was seen in the presence of carbon tetrachloride. Similar effects are illlustrated in FIGS. 4 and 5. In all cases carbon tetrachloride dependent hydrogen uptake was greatly enhanced by the presence of the riboflavin-cyanocobalamin mixture. Although the bacterial enrichment itself sometimes dechlorinated carbon tetrachloride in the absence of riboflavin-cyanocobalamin, the addition of these reagents greatly stimulated the rate of chloroform appearance.

EXAMPLE 7

Tetrapyrrole catalyzed dechlorination coupled to different species of Desulfovibrio Example 7 illustrates the relative abilities of different species of sulfate-reducing bacteria to perform dechlorination reactions as well as the need for the cytochrome $c_3$ electron transport protein as part of the cell membrane. *D. gigas* ATCC 19364, *D. desulfuricans* G100A, *D. salexigens* ATCC 14822, *D. desulfuricans* (Norway) as well as two negative control organisms which lack cytochrome $c_3$, *Escherichia coli* ATCC 26 and *Paracoccus denitrificans* ATCC 13543 were tested for their ability to couple to the riboflavincyanocobalamin electron transfer complex using hydrogen as the sole reductant.

Stock solutions were prepared for all cells as described in Example 2. All reactions contained 1 ml of cell suspension, in a mixture containing Riboflavin 1 mM, 100 ul; and cyanocobalamin 1 mM, 100 ul all in HEPES buffer pH 7.5 and made to a final volume of 2 ml. As in Example 2 the mixtures were gassed with hydrogen for 30 minutes and the reaction started with 3 ul of carbon tetrachloride. After 5 hr gas phase samples were taken for gas chromatographic analysis of carbon tetrachloride ($CCl_4$) and chloroform ($CHCl_3$) as described above. Data demonstrating the dechlorination of $CCl_4$ to $CHCl_3$ using the different cell types cells is shown in Table VII. Results are expressed as specific activity (nmol product/min/mg) to facilitate evaluation of relative activities.

TABLE VII

| Bacterial species | nmol $CHCl_3$ min/mg |
|---|---|
| D. desulfuricans Norway | 1.2 |
| D. desulfuricans G100A | 3.8 |
| D. salexigens | 34.0 |
| D. gigas | 29.0 |
| E. coli | 0.0 |
| P. denitrificans | 0.0 |

The data shown in Table VII demonstrate that *D. salexigens* and *D. gigas* drive the dechlorination of $CCl_4$ to $CHCl_3$ at a rate about 12 fold higher than either of the desulfuricans strains. As is expected the bacteria lacking the periplasmic cytochrome $c_3$ protein (*E. coli* and *P. denitrificans*) showed no dechlorination activity.

EXAMPLE 8

Dechlorination of Perchloroethylene by *D. gigas*/riboflavin/cyanocobalamin system Example 5 illustrates the ability of the instant method to dechlorinate perchloroethylene (PCE) to trichloroethylene (TCE).

Cell stock solutions of *D. gigas* were prepared as described above. Reaction mixtures were prepared by adding 1000 ul of cell stock solution to a mixture containing Riboflavin 1 mM, 100 ul; and cyanocobalamin 1 mM, 100 ul all in HEPES buffer pH 7.5 and made to a final volume of 2 ml. All mixtures were gassed with hydrogen for 30 minutes and the reaction started with 3 ul of perchloroethylene (PCE). Sample were taken (0.5 ml) at 0h, 21h, 44h, 128h, 266h, and 368h for gas chromatographic analysis of perchloroethylene (PCE) and trichloroethylene (TCE) as described above. Data demonstrating the dechlorination of PCE to TCE over time is shown in Table VIII.

TABLE VIII

| | nmol TCE* | |
|---|---|---|
| Hours | Cells alone | Cells + RB/B12 |
| 0 | 0 | 0 |
| 21 | 0 | 2.3 |
| 44 | 0 | 2.7 |
| 128 | 0 | 9.0 |
| 266 | 0 | 13.0 |
| 368 | 0 | 40.0 |

*Total product formed from perchloroethylene

The rates observed for PCE dechlorination are much lower than those observed for carbon tetrachloride dechlorination. This observation is not unique to this system but is generally reported for tetrapyrrole catalysis and bacterially catalyzed reactions as well. The data also indicate that the system is active for extended periods of time.

EXAMPLE 9

In situ tetrapyrrole catalyzed dechlorination of a chlorinated solvent-contaminated aquifer Example 9 illustrates the in situ bioremediation of an aquifer contaminated with chlorinated solvents.

In situ bioremediation of the a solvent contaminated aquifer may be accomplished in two steps. The first is the addition of specific nutrients to an aquifer which would be conducive to the growth of fermentive hydrogen-producing bacteria and also to sulfate reducing bacteria. The second step is the addition of hematin or riboflavin and hematin.

Step 1. Nutrient additions (first amendment) Site assessment

Initial assessment of the contaminated site for levels of contaminants and factors that will influence microbial cell growth will be needed. Based on the results of data collected from the site assessment, calculations of the concentrations of various amendments needed to support or enhance the growth of indigenous microbes will be made. Typically such amendments will include both glucose and sulfate.

Site assessment will show that the concentration of chlorinated solvent in an aquifer is well below 1 mM and more typically below 0.1 mM. Where the site is contaminated with 0.1 umol/ml perchloroethylene, calculations will show that 0.4 umol/ml hydrogen or 0.2–0.4 umol/ml of glucose will be required to support microbial growth, depending on the hydrogen-evolving fermentation pathway utilized by the indigenous bacteria within the aquifer. Calculations will show that 0.2–0.4 mM glucose is the minimal final concentration required to achieve dechlorination within the aquifer assuming all the electrons are derived from hydrogen. It is understood that metabolism of glucose will result in the formation of hydrogen, organic acids and carbon dioxide.

In the event that the natural geochemistry of the aquifer lacks sulfate, sulfate amendments will be made so that the sulfate is present in concentrations of at least twice that of the glucose concentration. Under these conditions the organic acids and hydrogen will be completely utilized for sulfate reduction by sulfate-reducing bacteria, indigenous to the aquifer. Additionally, the concentration of the stock solution glucose-sulfate amendment will be such that after addition and dilution into the aquifer the final glucose concentration is at least two fold molar excess over that of the pollutant and final sulfate concentration is in excess of the glucose concentration by at least a factor of two on a molar basis.

Introduction of amendments to aquifer

Introduction of the nutritional amendment into the aquifer may be performed by pumping the nutrients into the aquifer via a series of wells placed upstream of the contamination plume and natural aquifer flow. A series of monitoring wells is then placed downstream of the injection wells such that aquifer samples are routinely obtained to monitor transformations. The treated aquifer water is ultimately brought to the surface by a series of extraction wells placed farther downstream toward the end of the pollutant plume. The extracted water will then be recirculated to the injection well and reintroduced along with fresh nutrients. This process will result in a microbial population containing sulfate-reducing bacteria and hydrogen as an intermediate in the glucose fermentation.

Monitoring of microbial metabolism:

Monitoring of redox potential and sulfide production within the aquifer system will give an indication of a steady state level of sulfate-reducing metabolism in the aquifer. When a sufficiently high level of sulfate-reducing metabolism is seen on the basis of these parameters, additional amendments will be may to effect dechlorination of contaminating solvents. Levels of sulfide production are determined on the basis of methods previously described.

Step 2. Tetrapyrrole and electron transfer mediator addition (second amendment)

After the presence of sulfate-reducing bacteria have been established in the aquifer system the tetrapyrrole (hematin, cyanocobalamin) or riboflavinhematin-cyanocobalamin are introduced into the aquifer. The concentration of the tetrapyrrole or tetrapyrroleriboflavin is monitored in the recirculated waters such that a concentration of at least 25 uM is maintained for the tetrapyrrole. The concentration of riboflavin is less critical but is added at a concentration of about 1–5 mM.

The reagents will be introduced at the injection well in the same manner as the nutrients. The concentration of pollutants, tetrapyrrole and riboflavin are then be continuously monitored in therecirculated waters until dechlorination of the pollutants is complete. Dechlorination is determined by gas chromatographic methods as previously described.

What is claimed is:

1. A method for the dehalogenation of organohalogens from a sample containing organohalogens treated with a culture of sulfate reducing bacteria, a suitable reductant and a tetrapyrrole catalyst wherein the rate of dehalogenation in the treated sample is enhanced as compared with the untreated sample comprising the steps of:

(i) growing a culture of sulfate reducing bacterial cells in the presence of a suitable reductant useful for donating electrons to a tetrapyrrole catalyst, wherein said reductant is present in a molar excess as compared to said organohalogens;

(ii) contacting said cells with a media containing organohalogen compounds and a tetrapyrrole catalyst useful for catalyzing the dehalogenation of organohalogens, to form a reaction mixture; and (iii) incubating said reaction mixture under suitable anaerobic conditions and for a time sufficient to dehalogenate said organohalogens.

2. The process of claim 1 wherein said reaction mixture further comprises an electron transfer mediator containing an isoalloxazine ring wherein said mediator enhances electron transfer from said sulfate reducing bacteria to said tetrapyrrole and wherein the enhancement of dehalogenation is from about 20 to about 100 fold.

3. The process of claim 2 wherein said electron transfer mediator is riboflavin.

4. The process of claim 1 wherein said reductant is selected from the group consisting of lactate, propionate, formate, butyrate, acetate and salts thereof, hydrogen, and any organic capable of being fermented to hydrogen.

5. The process of claim 1 wherein said tetrapyrrole is selected from the group consisting of metalloporphyrins, phthalocyanines and corrins.

6. The process of claim 5 wherein said tetrapyrrole is selected from the group consisting of cyanocobalamin and hematin.

7. The process of claim 1 wherein said organohalogens are selected from the group consisting of carbon tetrachloride, perchloroethylene, chloroform, methylene chloride, trichloroethylene, dichloroethylene, vinyl chloride, and chloroaromatics.

8. A method for the dehalogenation of organohalogens from a sample containing organohalogens treated with a culture of sulfate reducing bacteria, a suitable reluctant and a tetrapyrrole catalyst wherein the rate of dehalogenation in the treated sample is enhanced as compared with the untreated sample comprising the steps of:

(i) growing a mixed culture of bacterial cells comprising sulfate-reducing bacteria for the provision of reducing conditions and fermentive bacteria for the provision of a suitable reductant, useful for donating electrons to a tetrapyrrole catalyst wherein said reductant is present in a molar excess as compared to said organohalogens and usable by said sulfate reducing bacteria in the presence of a carbon source, suitable for growth of said fermentive bacteria;

(ii) contacting said cells with a media containing organohalogen compounds and a tetrapyrrole catalyst useful for catalyzing the dehalogenation of organohalogens, to form a reaction mixture; and (iii) incubating said reaction mixture under suitable anaerobic conditions and for a time sufficient to dehalogenate said organohalogens.

9. The process of claim 8 wherein said reaction mixture further comprises an electron transfer mediator containing an isoalloxazine ring wherein said mediator enhances electron transfer from said sulfate reducing bacteria to said tetrapyrrole and wherein the enhancement of dehalogenation is from about 20 to about 100 fold.

10. The process of claim 8 wherein said tetrapyrrole is selected from the group consisting of porphyrins, metalloporphyrins, phthalocyanines and corrins.

11. The process of claim 8 wherein said organohalogens are selected from the group consisting of carbon tetrachloride, perchloroethylene, chloroform, methylene chloride, trichloroethylene, dichloroethylene, vinyl chloride, and chloroaromatics.

12. The process claim 8 wherein said carbon source is glucose.

13. The process of claim 8 wherein said reaction mixture further comprises an electron transfer mediator containing an isoalloxazine ring wherein said mediator enhances electron transfer from said sulfate reducing bacteria to said tetrapyrrole and wherein the enhancement of dehalogenation is from about 20 to about 100 fold.

14. A method of in situ dehalogenation of organohalogens from a soil or ground water site contaminated with organohalogens, said site being subject to remediation, wherein said dehalogenation is enhanced from about 20 to about 100 fold over a non-remediated site comprising:

(i) assessing said site for concentrations of nutrients, contaminants and conditions capable of affecting the growth of the indigenous bacterial population to determine the type and concentrations of amendments needed to encourage indigenous bacterial growth and to produce sulfate reducing conditions;

(ii) amending said site with a first amendment comprising nutrients, salts, phosphate and sulfate so as to produce sulfate-reducing conditions resulting in the production of measurable amounts of hydrogen sulfide;

(iii) monitoring the redox potential and sulfide production of said first amended site to determine levels of bacterial growth and assess the need for additional amendments for the maintenance of sulfate reducing conditions;

(iv) further amending said site with a second amendment comprising a tetrapyrrole catalyst while maintaining said sulfate-reducing conditions; and (v) monitoring said site for the dehalogenation of organohalogens.

15. The process of claim 14 wherein said tetrapyrrole is selected from the group consisting of metalloporphyrins, phthalocyanines and corrins.

16. The process of claim 14 wherein said organohalogens are selected from the group consisting of carbon tetrachloride, perchloroethylene, chloroform, methylene chloride, trichloroethylene, dichloroethylene, vinyl chloride, and chloroaromatics.

* * * * *